June 23, 1953 P. A. K. BOEDER 2,642,776
VARIABLE POWER BIFOCAL LENS
Filed Dec. 31, 1949 2 Sheets-Sheet 1

INVENTOR.
PAUL A. K. BOEDER
BY
Louis L. Gagnon
ATTORNEY

Patented June 23, 1953

2,642,776

UNITED STATES PATENT OFFICE 2,642,776

VARIABLE POWER BIFOCAL LENS

Paul A. K. Boeder, Southbridge, Mass., assignor to American Optical Company, Southbridge, Mass., a voluntary association of Massachusetts Application December 31, 1949, Serial No. 136,232

11 Claims. (Cl. 88—47)

This invention relates to vision corrective means and has particular reference to the provision of multi-focal lens systems having at least one focal field variable as to its corrective power, and method of making the same.

One of the principal objects of the invention is to provide corrective lens systems adapted to be positioned in a mounting for supporting said systems before the eyes of the wearer wherein at least two fields of different focal power for the correction of distance and near vision are provided, with the power of at least one of said focal fields being variable and method of making same.

Another object is to provide vision corrective means embodying a pair of aligned lens elements each having at least two different focal fields and means for supporting said elements whereby one element may be adjusted to varying spaced relation with respect to the other, the optical characteristics of said elements being such that the power of one of said fields will vary in accordance with the extent of adjustment while the power of the other of said fields remains substantially constant.

Another object is to provide corrective lens systems for correcting errors of vision embodying two separately aligned lens elements each having a distance and a near field and means for supporting said lens elements for adjustment toward and away from each other whereby the power of at least one of said fields may be varied.

Other objects and advantages of the invention will become apparent from the following description taken in connection with the accompanying drawing, in which.

Vision corrective lens systems are often found desirable in cases where it is necessary to quickly and easily adjust the vision of the user to more clearly see a particular object disposed within the visual field. However, for cases where such systems are used by individuals normally requiring vision corrective prescription lens systems such as bifocal lenses, it has been difficult to devise means whereby the power of the near field can be adjusted without affecting a material change in the distance field.

The present invention provides means for doing this and embodies a pair of aligned lens elements each having at least two different focal fields and means for supporting said lenses whereby one lens of each of said pair of elements may be adjusted to varying spaced relation with respect to the other of said lenses, the optical characteristics of said lenses being so controlled that the power of one of said fields will vary in accordance with the extent of adjustment while the power of the other of said fields remains substantially constant.

Figure 1:
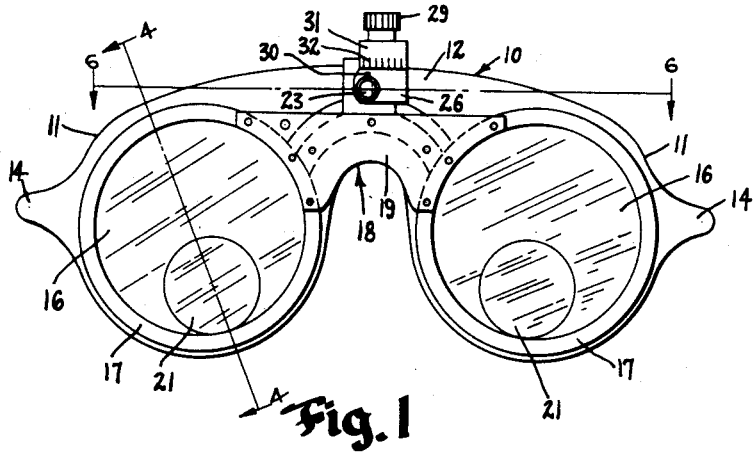
Fig. 1 is a front elevational view of an ophthalmic mounting embodying the invention.
Figure 2:
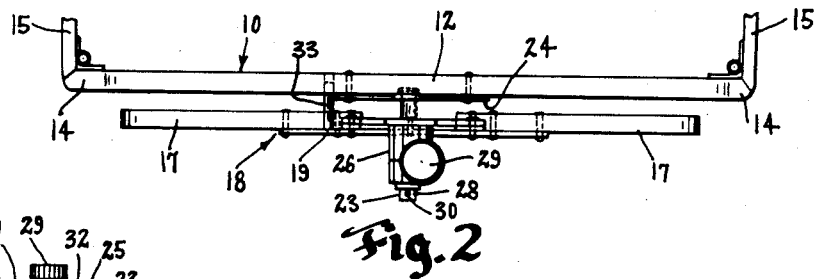
Fig. 2 is a top plan view of the device shown in Fig. 1.
Figure 3:
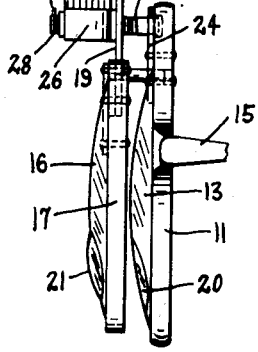
Fig. 3 is a side elevational view of the device shown in Figs. 1 and 2.

Referring more specifically to the drawing wherein like characters of reference designate like parts throughout the several views, Fig. 1 illustrates an embodiment of the invention and comprises a conventional ophthalmic frame 10 having a pair of spaced lens holding rims 11 which are suitably rigidly connected by an integral bridge member 12. The frame 10 may be formed of any suitable material and may be shaped to retain a pair of main lens elements 13 in desired spaced relation in a plane transversely of the line of straight ahead vision and are preferably provided with end portions 14 to each of which is suitably pivotally connected a temple member 15 (Fig. 2) for supporting the device on the head of the wearer.

A second or auxiliary pair of lens elements 16 is suitably supported in a pair of rims 17 forming a part of an auxiliary frame 18 and connected by a bridge member 19. The elements 16 are disposed in superimposed relation with the front surfaces of the main elements 13, each of the auxiliary elements 16 being substantially concentric with the adjacent main lens element 13. The auxiliary frame 18 is adapted to be spaced as desired with respect to the main frame 10, for positioning the auxiliary lens element 16 either in abutment with the main lens elements 13 or in desired spaced relation therewith.

In accordance with this invention, the lens elements 13 have embodied therein the prescriptive characteristics required for the correction of the distance vision of an individual and in their lower regions each of said lens elements has a countersunk portion 20 in the area in which the segment of a bifocal type lens is normally located.

In forming the lens 13, the curve 35 thereof is preferably spherical and of a radius of curvature controlled according to the prescriptive power desired in the distance field of the lens. The surface 36 is computed in combination with the curvature of the surface 35 and the index of refraction and thickness of the glass to introduce the power desired in the distance field. The surface 36 may be spherical or toric in shape depending upon the nature of the prescription. The element 13, therefore, is controlled to introduce the power desired for the distance field and in addition thereto has a countersink curve 20 formed in the lower region thereof and throughout the area desired for the near vision of the system.

The radius of curvature of the surface 35 may be varied as desired dependent upon the prescriptive curves to be formed on the surface 36 and in accordance with the conventional practice of dispensing lenses.

It is quite obvious that the lens element 13 may be dispensed in the form of a semi-finished element having only the front surface curvature 35 formed thereon together with the countersink curve 20, and the rear or prescriptive curve 36 may be thereafter formed thereon in accordance with the requirements of a particular individual.

The lens elements 16 are preferably formed with a rear surface 37 contrageneric to the curvature of the surface 35 so as to fit intimately therewith when the two elements are moved to contiguous relation with each other. The front surfaces 38 are formed substantially parallel with the surfaces 37 with a view to avoiding the introduction of power or a power change as to the desired corrective value of the distance field of the lens, and the curvatures of the surfaces 38, therefore, will depend upon the curvatures required of the surfaces 37 in order to intimately fit with the surfaces 35 of the element 13.

In the system illustrated throughout Figs. 1 through 6, the rear surface 37 of the element 16 is provided with a segment 22 whose rear surface curvature 39 is substantially contrageneric to the curvature of the countersink 20. It might be said here that the curvature of the surface 39 and the countersink 20 may be varied in accordance with the increased added power desired when the elements are adjusted to each other.

The said element 16, on the front surface thereof, is provided with a segment 21 having a surface curvature 40 thereon controlled according to the added power desired through the focal field produced by said segment.

It is pointed out that the countersink 20, segment 22, and segment 21 are so related with each other as to cause segment 22 and the countersink 20 to become relatively intimately related when the surfaces 35 and 37 of the major lens elements are in engagement or in near engagement with each other.

The indices of refraction of the segments 21 and 22 may be formed of substantially the same indices of refraction as the major elements 13 and 16 or may be varied according to the outer surface curvatures formed on said segments and the curvature of the countersink.

Due to the fact that the element 16 has substantially no power change throughout the distance field of the lens during the adjustment of the element 16 in relation to the element 13, it may be made of any desired index of refraction. It is, however, formed of the same index of refraction as the element 13 for economic reasons.

Figure 7:
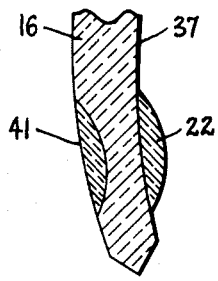
Figs. 7, 8 and 9 are fragmentary sectional views illustrating modified forms of one of the lens elements which may be used with the device.

Although the element 16 has been described as having a separate segment 21 secured thereto, it is to be understood that the said element 16 may have a segment 41 of glass of a higher index of refraction fused in a countersink formed therein. In this latter instance, the front surface curvature 38 will be continuous throughout the area of the lens (Fig. 7) and the added power will now depend upon the curvature of the combined countersink and the index of refraction of the portion 41. The rear surface 37, however, is still provided with the segment 22 which is similar in nature to the segment 22 of the previously described construction. The segment 22 is preferably formed of glass of substantially the same index of refraction as the element 13 but may be made to a different index of refraction, as desired, and as stated more in detail hereinafter.

Figure 8:
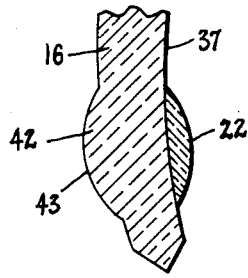

Instead of employing a cemented or fused-on segment 21 or a segment 41 fused into a countersink in the element 16, the said element 16 may be provided with an integral field 42 (Fig. 8) having a front surface curvature 43 thereon controlled according to the minimum added power desired through this portion of the system. Again, segment 22 is secured to the rear surface 37 as is stated with the previous construction.

Figure 9:
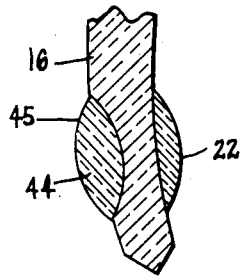

In Fig. 9, there is illustrated a further modification wherein the segment 44 has one of its surfaces fused within a countersink within the element 16 but further has its outer surface 45 formed with a bulging curve to obtain initial added power desired. Again, a segment 22 having the same characteristics as the previously named segments is secured to the rear of the element 16.

Figure 4:
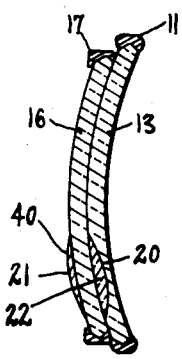
Fig. 4 is a sectional view taken on line 4—4 of Fig. 1 showing the lens elements in close relation.

When the elements 13 and 16 are positioned in contiguous relation with each other, as illustrated in Fig. 4, the distance field will be of a power controlled according to the related surface curvatures provided on the element 13 as previously described. The added power through the reading field of the lens, however, will be only that introduced by the element 21, 41, 42 or 44 as the portion of the element 13 having the countersink 20 therein and the segment 22, by reason of the fact that they are in engaging relation with each other and, in this particular instance, are formed of glasses of substantially the same index of refraction, will introduce substantially no power change, that is, one will cancel the other so that only the added power introduced by the segment 21 remains.

Figure 5:
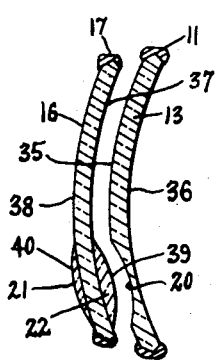
Fig. 5 is a sectional view taken on line 4—4 of Fig. 1 showing the lens elements in spaced relation.
Figure 6:
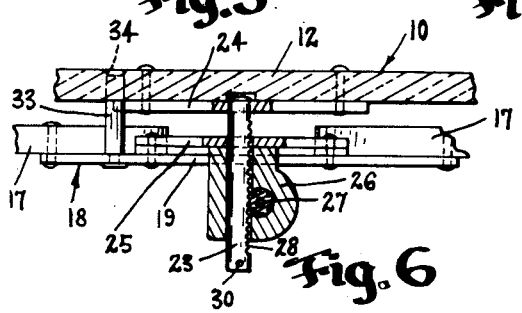
Fig. 6 is a fragmentary sectional view illustrating particularly the means for adjusting the lens elements relative to each other.

If, however, the elements 13 and 16 are moved to a spaced relation with each other, as illustrated in Fig. 5, there will be a power change introduced by the segment 22 as it will then function as a separate lens and when spaced relative to the countersink 20 will increase the added power through the near vision portion of the device. The greater the space, the greater the increase in added power. This added power will then be the combined function of that introduced by the segment 21 and the spaced relation of the segment 22 with the countersink 20.

Figure 10:
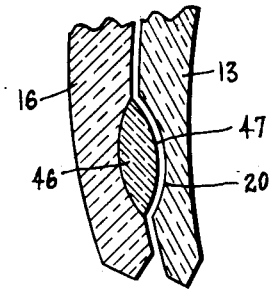
Fig. 10 is a fragmentary sectional view of a further modification of the device.

Although it has been stated that the segment 22 is preferably formed of a glass of substantially the same index of refraction as the element 13, it may be formed of a glass of a higher index of refraction and the elements may be constructed as illustrated preferably in Fig. 10. In this instance, the element 13 is provided with a countersink 22 of desired curvature and the segment 46 is formed with an outer surface curvature 47 contrageneric or substantially contrageneric to the curvature of the countersink 20. The index of refraction, however, is increased in this instance, according to the initial amount of added power desired through this area of the lens. By this, it is meant that when the element 16 is adjusted to engaging relation with the element 13 and the segment 46 is in relatively intimate relation with the curvature of the countersink, the added power then will be only that introduced by the difference of index of refraction of the segment and when the said elements 13 and 16 are spaced with respect to each other, then the additional added power will take effect in a manner similar to the lens systems described above. In this instance, the segment 46 is fused or otherwise secured within a countersink formed in the rear surface of the element 16 and by altering the curvature of this countersink in accordance with the index of refraction of the glass of the segment, the initial minimum added power desired when the elements are in engaging relation with each other may be varied.

It is pointed out that when the element 16 is adjusted to varying spaced relation to element 13 and, due to the fact that it has substantially no power, there will be no material change in the total power of the distance field of the lens as introduced as stated above. The only change, therefore, will be in the overall power of the reading field.

As an example, assuming that the countersink 20 in each of the lens elements 13 is formed to a curvature of approximately 12.50 diopters and the curve 39 formed on the segments 22 is contrageneric to the curve of the countersink and the front segment 21 is such as to introduce a power of approximately 1.50 diopters, if the lens elements are positioned in an engaging relation with each other, as shown in Fig. 4, the portion of the lens having the countersink 20 therein and the segment portion 22 will cancel or substantially neutralize the effect of the segment 22, thereby introducing only the added power of the segment 21 which, in this instance, is 1.50 diopters. However, if the lenses 16 and 13 are separated, say by about 3 mm., the added power through the reading area will be increased by approximately 1.20 diopters making a total added power of approximately 2.70 diopters. The overall total power may be varied, therefore, by controlling the space between the elements 16 and 13. As the element 16 is adjusted inwardly toward the element 13, the total effective added power will be proportionately decreased until the engaging point is reached wherein only the added power, as introduced by the segment 21, will prevail.

The means for connecting the auxiliary frame 18 and lenses 16 to the main frame 10 comprises a forwardly extending pin 23 which is fixedly carried by a reinforcing plate 24 pinned or otherwise attached to the front surface of the main bridge 12. The pin 23 has a rack section 28 on the side thereof. The rear surface of the auxiliary bridge member 19 fixedly carries an upwardly extending bracket 25 which has a block 26 secured to its front surface. The block 26 is provided with a longitudinal opening for sliding reception of the pin 23 and is provided with a pinion gear 27 which meshes with the teeth of the rack section 28 of the pin 23. The gear 27 is mounted on a pivot rod which is rotatably mounted in the block 26 and which carries a knob 29 by which the gear may be manually rotated. Adjacent the outer end of the pin 23 there is provided a stop pin 30 for limiting the outward movement of the block 26 on said pin. Thus, upon manual rotation of the knob 29 the block 26 will be moved longitudinally of the pin 23 and, due to the fixed attachment of the bracket 25 and auxiliary frame 18 to said block the lens elements 16 will be moved relative to the lens elements 13 to be spaced as desired. A collar or similar ring-like member 31 having graduations 32 provided circumferentially on its exterior surface is fixedly attached to the operating knob 29 to visually indicate the amount of rotative movement of the knob and consequently the spacing between the lenses 16 and 13.

To further assist in guiding the auxiliary frame 18 during its reciprocating movements, there is provided a guide pin 33 which is carried by the auxiliary bridge member 19 of the auxiliary frame 18 and which slidably extends through an opening 34 (Fig. 6) in the bridge member 12 of the main frame 10. Thus, the auxiliary frame 18 is prevented from tilting movement about the pin 23.

It is to be understood that although the foregoing description refers particularly to the use of lenses 13 having a prescription power therein, the device can be satisfactorily used with lenses having no prescription in the distance fields, it being essential, however, that the bifocal segments 21 and 22 be so constructed that their focal power may be adjusted as desired upon operation of the means for spacing the lenses, as described above.

From the foregoing it will be seen that simple and efficient means and method have been provided in accordance with the objects set forth hereinabove and embodying an ophthalmic mounting supporting a pair of aligned lens elements before each eye of the wearer, said lens elements each being provided with at least two fields of different focal powers for the correction of distance and near vision with said near vision power being variable whereby the near vision of the wearer may be corrected as required for varying degrees of accommodation.

While the novel features of the invention have been described and are pointed out in the annexed claims, it will be understood that many changes may be made in the details of construction shown and described without departing from the spirit of the invention. I, therefore, do not wish to be limited to the exact details shown and described as the preferred only are set forth by way of illustration.

I claim:

1. A vision corrective device comprising front and rear lens elements connected for adjustment toward and away from one another, said rear lens element having its surface curvatures controlled to introduce the power desired in the distance field of the device and having a near field area in the form of a countersink of controlled shape formed in the lower region of its front surface, and said front lens element being substantially concentric with said rear lens element and having the major portion of its rear surface of a curvature substantially contrageneric with the curvature of the front surface of the rear lens element, and its front surface substantially parallel with its rear surface and having a near field area in the form of opposed segments provided on each of the opposed front and rear surfaces thereof and substantially concentric with the countersunk portion in said rear lens element, the segment on the rear surface of said front lens element having a curvature substantially contrageneric with the curvature of said countersink, whereby the power of said near fields will vary in accordance with the extent of adjustment of the lens elements toward and away from one another while the power of the distance fields will remain substantially constant.

2. An ophthalmic mounting comprising a main frame embodying a pair of spaced main lens supporting members, a main bridge member connecting said main lens supporting members, an auxiliary frame carried by said main frame comprising a pair of spaced auxiliary lens supporting members and an auxiliary bridge member connecting said auxiliary lens supporting members, control means for adjusting said frames toward and away from one another, a main lens carried by each of said main lens supporting members, each of said main lenses having its surface curvatures controlled to introduce the power desired in the distance field of the device and having a near field area in the form of a countersink of controlled shape formed in the lower region of its front surface, and auxiliary lenses carried by each of said auxiliary lens supporting members, each of said auxiliary lenses being substantially concentric with one of said main lenses and having a curvature on the major portion of its surface directed toward the adjacent main lens substantially contrageneric with the curvature of the adjacent surface of said main lens and its front surface substantially parallel with its rear surface, and having a near field area in the form of opposed segments provided on each of the opposed surfaces thereof, said segments being substantially concentric with the countersunk portion in said main lens, the segment on the surface of said auxiliary lens directed toward the main lens having a curvature substantially contrageneric with the curvature of said countersink, whereby the power of said near fields will vary in accordance with the extent of adjustment of the main and auxiliary frames toward and away from one another while the power of the distance fields will remain substantially constant.

3. An ophthalmic mounting comprising a main frame embodying a pair of spaced main lens supporting members, a main bridge member connecting said main lens supporting members, an auxiliary frame carried by said main frame comprising a pair of spaced auxiliary lens supporting members and an auxiliary bridge member connecting said auxiliary lens supporting members, control means for adjusting said frames toward and away from one another, lenses carried by each of said main and auxiliary lens supporting members, said lenses each having at least two fields of different focal powers arranged and aligned to correspond in size and shape with the fields of the other lens and with the power in one field of one of said lenses being approximately zero whereby the total effective power through one of said pairs of fields will vary in accordance with the extent of adjustment of the frames with respect to each other while the effective total power through the other pair of said fields will remain substantially constant, said control means comprising a shaft carried by said main frame, a block carried by said auxiliary frame and shaped to slide longitudinally of said shaft, and ratchet means carried by said block and engaging said shaft for causing movement of said block on said shaft and consequently adjusting said main and auxiliary frames in a direction toward and away from one another.

4. An ophthalmic mounting comprising a main frame embodying a pair of spaced main lens supporting members, a main bridge member connecting said main lens supporting members, an auxiliary frame carried by said main frame comprising a pair of spaced auxiliary lens supporting members and an auxiliary bridge member connecting said auxiliary lens supporting members, control means for adjusting said frames toward and away from one another, lenses carried by each of said main and auxiliary lens supporting members, said lenses each having at least two fields of different focal powers, said fields in one lens being arranged to correspond in size and shape with the fields of the other lens, and with one field in one lens being of substantially zero power whereby the total effective power of one pair of said fields will vary in accordance with the extent of adjustment of the frames with respect to each other while the total effective power of the other pair of said fields will remain substantially constant, said control means comprising a shaft carried by said main frame, a block carried by said auxiliary frame and shaped to slide longitudinally of said shaft, motion imparting means carried by said block and engaging said shaft for causing movement of said block on said shaft and consequently adjusting said main and auxiliary frames in a direction toward and away from one another, and registering means on said motion imparting means for indicating the extent of said adjustment.

5. An ophthalmic mounting comprising a main frame embodying a pair of spaced main lens supporting members, a main bridge member connecting said main lens supporting members, an auxiliary frame carried by said main frame comprising a pair of spaced auxiliary lens supporting members and an auxiliary bridge member connecting said auxiliary lens supporting members, control means for adjusting said frames toward and away from one another, lenses carried by each of said main and auxiliary lens supporting members, said lenses each having at least two fields of different focal power aligned with respective fields of similar size and shape in the other lens, the power in one field of one lens being approximately zero whereby the effective total power of one pair of said fields will vary in accordance with the extent of adjustment of the frames with respect to each other while the effective total power of the other pair of said fields will remain substantially constant, said control means comprising a shaft carried by said main frame, a block carried by said auxiliary frame and shaped to slide longitudinally of said shaft, motion imparting means carried by said block and engaging said shaft for causing movement of said block on said shaft and consequently adjusting said main and auxiliary frames in a direction toward and away from one another, and guide means fixedly carried by one of said frames and shaped to slide within an opening in the other of said frames for preventing tilting movement of the frames with respect to each other during said adjustment.

6. An ophthalmic mounting comprising a main frame embodying a pair of spaced main lens supporting members, a main bridge member connecting said main lens supporting members, an auxiliary frame carried by said main frame comprising a pair of spaced auxiliary lens supporting members and an auxiliary bridge member connecting said auxiliary lens supporting members, control means for adjusting said frames toward and away from one another, a main lens carried by each of said main lens supporting members, each of said main lenses having its surface curvatures controlled to introduce the power desired in the distance field of the device and having a near field area in the form of a countersink of controlled shape formed in the lower region of its front surface, auxiliary lenses carried by each of said auxiliary lens supporting members, each of said auxiliary lenses being substantially concentric with one of said main lenses and having a curvature on the major portion of its surface directed toward the adjacent main lens substantially contrageneric with the curvature of the adjacent surface of said main lens and its front surface substantially parallel with its rear surface, and having a near field in the form of opposed segments provided on each of the opposed surfaces thereof, said segments being substantially concentric with the countersink in said main lens, the segment on the surface of said auxiliary lens directed toward the main lens having a curvature substantially contrageneric with the curvature of said countersink portion, whereby the power of said near fields will vary in accordance with the extent of adjustment of the main and auxiliary frames toward and away from one another while the power of the distance fields will remain substantially constant, said control means comprising a shaft carried by said main frame, a block carried by said auxiliary frame and shaped to slide longitudinally of said shaft, and motion imparting means carried by said block and engaging said shaft for causing movement of said block on said shaft and consequently adjusting said main and auxiliary frames in a direction toward and away from one another.

7. An ophthalmic mounting comprising a main frame embodying a pair of spaced main lens supporting members, a main bridge member connecting said main lens supporting members, an auxiliary frame carried by said main frame comprising a pair of spaced auxiliary lens supporting members and an auxiliary bridge member connecting said auxiliary lens supporting members, control means for adjusting said frames toward and away from one another, a main lens carried by each of said main lens supporting members, each of said main lenses having its surface curvatures controlled to introduce the power desired in the distance field of the device and having a near field area in the form of a countersink of controlled shape formed in the lower region of its front surface, auxiliary lenses carried by each of said auxiliary lens support-ing members, each of said auxiliary lenses being substantially concentric with one of said main lenses and having a curvature on the major portion of its surface directed toward the adjacent main lens substantially contrageneric with the curvature of the adjacent surface of said main lens and its front surface substantially parallel with its rear surface, and having a near field in the form of opposed segments provided on each of the opposed surfaces thereof, said segments being substantially concentric with the countersink in said main lens, the segment on the surface of said auxiliary lens directed toward the main lens having a curvature substantially contrageneric with the curvature of said countersink, whereby the power of said near fields will vary in accordance with the extent of adjustment of the main and auxiliary frames toward and away from one another while the power of the distance fields will remain substantially constant, and registering means on said control means for indicating the extent of said adjustment.

8. A vision corrective device comprising a pair of approximately concentric meniscus shaped lens elements and structure supporting said lens elements in aligned relation, one of said lens elements being mounted on the supporting structure for adjustment toward and away from the other, said lens elements each having a pair of fields arranged in substantial alignment with the corresponding fields of the other element, the inner adjacent concave surface of the front element being substantially contrageneric with the inner convex surface of the rear element, the outer surface of the front element within the limits of said pair of corresponding fields being nearly parallel with its inner surface so as to have substantially zero power and the outer surface of the rear element within the limits of its corresponding field being related to its inner surface according to the optical power desired in said field, the inner surface of one of said lens elements being provided with a countersink defining the limits of the other pair of corresponding fields and having its surface curvatures related to introduce minus power, the inner surface of the other element being provided with a convexly shaped surface to fit within said countersink, said convexly shaped surface being related with the surface shape of the outer surface of said lens element within the limits of said other pair of corresponding fields to introduce plus power whereby the said lens elements may be adjusted toward and away from each other to alter the total effective power through said last mentioned corresponding fields of the elements while retaining the total effective power through the first mentioned corresponding fields of the two elements substantially constant.

9. A vision corrective device comprising a first lens element having its opposed surfaces related according to a desired optical power therefor and further having a countersink in its forward surface, the inner surface of said countersink being related with the rear surface of the lens element to introduce a desired minus power through said area of the lens element, a second lens element disposed forwardly of said first lens element and having a portion in alignment with said countersink provided with curvatures on its opposed side to introduce plus power, said portion being surrounded by an area having substantially no power and being of a size equal to, and having its inner surface shaped to substantially fit within said countersink, means holding said lens elements in said relation together with means for adjusting said lens elements on said holding means toward and away from each other whereby the power of the first lens element through the countersink may be varied according to the spacing of the second lens element relative thereto while the effective total power through the remainder of the lens is held substantially constant.

10. A vision corrective device comprising a structure for supporting a pair of lens elements in spaced relation before the eyes of a user of the device, and a frame mounted on said structure for supporting a second pair of lens elements in alignment with said first pair of lens elements, said lens elements each having a pair of fields arranged in substantial alignment with the corresponding fields of the element of the other pair with which it is aligned, the inner adjacent surfaces of each of the two aligned elements within the limits of one of said pair of corresponding fields being substantially contrageneric, the outer surface of one of each of said two aligned elements within the limits of said pair of corresponding fields being of a curvature such with its inner surface as to provide substantially zero power, and the outer surface of the other of said two aligned elements within the limits of its corresponding field being controlled according to the optical power desired in said field, the surface curvatures of each of said two aligned lens elements within the limits of the other pair of corresponding fields thereof being so related as to introduce plus power in the first one of the two aligned lens elements and a different power other than zero in the other of said two aligned lens elements, and means for adjusting said frames toward and away from the supporting structure whereby the total effective power through said last mentioned corresponding fields of the aligned elements may be altered in value while retaining the total effective power through the first mentioned corresponding fields of the two elements substantially constant.

11. A vision corrective device comprising a main frame for supporting a pair of lens elements before the eyes of a user of the device, and a second frame mounted on said main frame for supporting a second pair of lens elements, the lens elements mounted in the main frame each having their opposed surfaces related according to a desired optical power and further having a countersink in their forward surface, the inner surface of said countersink being related with the rear surface of the respective lens element to introduce a desired minus power through said area of the lens elements, and lens elements supported in the second frame each having a portion in alignment with said countersink provided with curvatures on its opposed sides to introduce plus power, said portion being surrounded by an area having substantially no power, said area being of a size equal to and having its inner surface shaped to substantially fit with said countersink, and means for adjusting said second frame toward and away from the main frame while retaining said alignment of the lens elements whereby the power through the countersink of the lens elements carried by the main frame may be varied according to the spacing of the second lens element relative thereto while the effective total power through the remainder of the lens is held substantially constant.

PAUL A. K. BOEDER.

References Cited in the file of this patent

UNITED STATES PATENTS

| Number | Name | Date |
| --- | --- | --- |
| 805,438 | Bell | Nov. 28, 1905 |
| 1,400,098 | Perrin | Dec. 13, 1921 |
| 2,388,673 | Brown | Nov. 13, 1945 |

FOREIGN PATENTS

| Number | Country | Date |
| --- | --- | --- |
| 78,652 | Germany | Mar. 29, 1894 |
| 212,572 | Germany | Aug. 3, 1909 |
| 419,669 | France | Nov. 21, 1910 |
| 372,895 | Italy | July 13, 1939 |